Aug. 29, 1972     A. B. SCHOLES     3,687,651
IGNITION FLASH CONTROL MEANS FOR BOTTLE TREATMENT
Filed Dec. 26, 1968     2 Sheets-Sheet 1
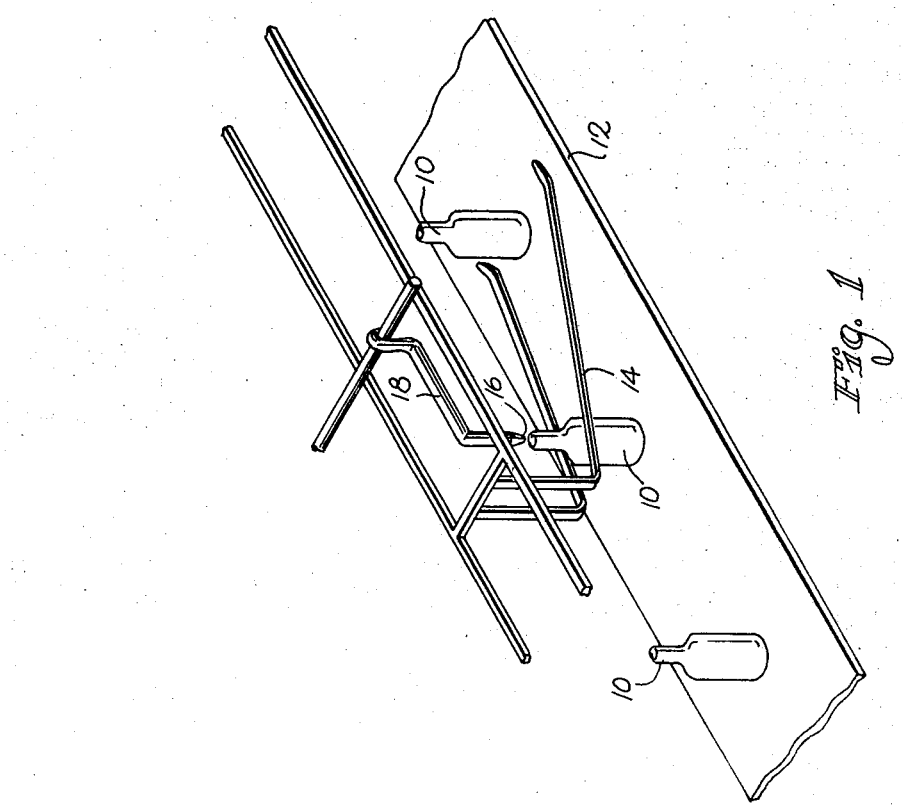
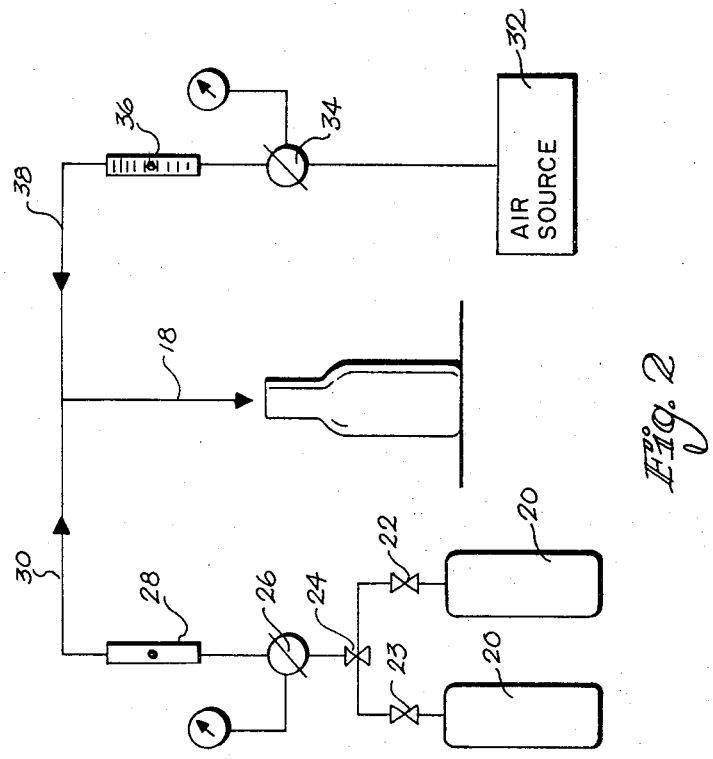
INVENTOR.
ADDISON B. SCHOLES
BY Campbell, Harris and O'Rourke
ATTORNEYS

INVENTOR.
ADDISON B. SCHOLES

BY Campbell, Harris and O'Brien

ATTORNEYS

United States Patent Office 3,687,651
Patented Aug. 29, 1972

3,687,651
IGNITION FLASH CONTROL MEANS
FOR BOTTLE TREATMENT
Addison B. Scholes, Muncie, Ind., assignor to Ball
Brothers Company Incorporated, Muncie, Ind.
Filed Dec. 26, 1968, Ser. No. 787,041
Int. Cl. C03b
U.S. Cl. 65—161          10 Claims

ABSTRACT OF THE DISCLOSURE

A method and apparatus for treating newly formed glass containers with gaseous materials which improve chemical durability of the glass, by passing glass containers under a fixed nozzle from which the gas continuously issues, and monitoring means utilizing the ignition flash of flammable treatment gas to ensure that the otherwise unobservable treatment is, in fact, carried out.

---

The instant invention relates to a method and apparatus for improving chemical durability of glass and for testing such improvement. More particularly, the instant invention relates to a method and apparatus for treating soda lime glass to improve the chemical durability thereof utilizing minuscule amounts of treatment material, and for ensuring that such glass is, in fact, treated.

Glass containers are for the most part produced from soda lime glass. However, as is well known in the art, soda lime glass is attacked by water, and particularly water vapor, with the result that soda is extracted from the glass. In some cases, this merely results in an undesirable bloom or film of soda which must be removed for aesthetic reasons before the glass is utilized. However, in other uses such as the packaging of pharmaceutical and food products which are adversely affected by the extracted sodium, the glass must even undergo a complicated treatment with sulfur dioxide glass, or the glass composition utilized for such purposes must be of the low alkaline type such as the boro silicate classes.

More recently, it has been discovered that glass surfaces treated with decomposable, halogen-containing gaseous compounds, and particularly fluorine-containing compounds, are much more resistant to attack by water and other materials such as alkaline solutions. While many suitable treatment gases are available, halogen substitute $C_1$–$C_4$ alkanes and $C_2$–$C_4$ alkenes are among the most available. Such treatments must be carried out upon glass at an elevated temperature, and preferably upon newly formed glass ware at an elevated temperature which has not been subjected to attack by water vapor. Soda lime glass treated according to these processes has been found to be suitable for pharmaceutical and other critical packaging uses. Such treated glassware is said to be of improved chemical durability. A more complete discussion of such treatments is to be found in United States Letters Patent No. 3,249,246, issued May 3, 1966 to William P. Mahoney and assigned to the assignee of the instant invention.

Heretofore, it has been thought that rather substantial amounts of treatment gas were necessary to accomplish the desired improvement in chemical durability. Thus, the previous methods of improving chemical durability usually involved registering an injection nozzle with the glass container, injecting a measured amount of treatment material into the container, terminating flow of the treatment material, and moving the injection nozzle into register with another container. Actually, most of the suggested methods for improving chemical durability have only been carried out as laboratory experiments and, while successful in accomplishing the desired increase in chemical durability, have been somewhat complicated when adapted to commercial uses. For instance, it has been suggested that the treatment gas be incorporated into the blowing air of a glass forming machine. The glass-forming machine is a very intricate apparatus already troubled with many variables. Therefore, it is not desirable to add yet another complication to the glass-forming machine, and particularly not to add a complication wherein the blowing air is expected to carry a significant percentage of a flammable treatment gas.

Yet another drawback is inherent in the known procedure. That is the testing and quality control problem resulting from economical use of the treatment gas. When used in minimal amounts, the treatment gas alters the chemical durability of the glass without changing the physical appearance of the glass. Thus, there was no workable way to ensure in a foolproof manner that the glass had, in fact, been treated. Inadvertently passing untreated glass as treated glass is quite serious in the food industry in that the taste and/or appearance of a food product could be adversely affected by leached soda. However, the damage would be limited to the user's appetite and the packager's reputation. In the pharmaceutical field, for instance with regard to containers for whole blood, the consequences of omission of chemical durability treatment could be much more serious.

In order to ensure that glass is actually treated, it has heretofore been considered desirable to utilize a gross excess of treatment to produce an observable haze on the glass. After visual inspection, the haze was removed by washing with water. While this approach was wasteful of treatment gas and involved an additional washing step, the importance of testing for treatment often outweighs these considerations. Even with these drawbacks, such treatments were more convenient than the alternatives.

It is, therefore, an object of the instant invention to provide a method for treating glass containers in a simple, economical manner.

Another object of the instant invention is to provide a method of treating glass containers at a noncritical point of the production process.

Still another object of the instant invention is to provide a method of treating newly formed glass containers utilizing a fixed, non-movable application apparatus.

Still yet another object of the instant invention is to provide a method of treating glass containers utilizing a constant flow of treatment gas.

Yet another object of the instant invention is to provide an apparatus whereby glass containers may be treated utilizing very low concentrations of treatment gas.

Another object of the instant invention is to provide an apparatus for carrying out a simple, economical treatment of newly formed glass containers at a non-critical point in the glass-forming operation utilizing foolproof equipment and a very low concentration of treatment gas.

Yet still another object of the instant invention is to provide a method and apparatus for monitoring to ensure treatment of glass when utilizing very small amounts of treatment gas.

Other objects of the instant invention will be readily apparent from the drawings and the following discussion.

According to the instant invention, newly formed glass containers are treated as they move from the glass-forming machine to the annealing lehr. The treatment may be accomplished while the glass containers are on the belt or transfer mechanisms, but it is preferred that the containers be treated as close to the glass-forming machine as is convenient. The newly formed glass containers are at a more elevated temperature when leaving the glass forming machine than when further downstream in the process. Thus, since the treatment is more efficient and effective at higher temperatures, the preferred placement of the treatment apparatus is closely adjacent the glass-forming machine.

At least one single file row of the newly produced glass containers is formed on the conveyor. While it is possible to have a number of such rows on a single conveyor, production speeds of 8500 containers per hour may be satisfactorily treated utilizing a single row of containers. The containers are passed under a downwardly directed nozzle at the usual conveyor speed which may be up to or in access of 35 feet per minute. Preferably, positioning means are employed to ensure that the container opening passes directly under the nozzle. A solution of treatment gas, rather highly diluted with air as a carrier, issues from the nozzle with appreciable velocity. Depending upon such variables as container volume, container opening size, belt speed, container temperature, glass composition, and container configuration, as little as from 0.1 to 0.5 cubic feet per hour of treatment gas is employed to treat at least 8500 glass containers per hour. Thus, it will be appreciated that the containers are only under the treatment nozzle for an instant, and the gas issuing from the nozzle contains very little treatment gas. In fact, it has been found that alkali extraction from the container interior surface could be halved using only .0003 cubic inch of treatment gas per square inch of glass surface.

A $3/16$-inch diameter nozzle has been found satisfactory to impinge the treatment gas jet into a passing container, but in view of the very small amount of treatment gas flow, it is necessary that the treatment gas be carried in another gas, usually air, in order to gain sufficient velocity to be so carried into a glass container passing under the nozzle. For this reason, carrier gas is mixed with the treatment gas in amounts from at least 30 times as much carrier gas as treatment gas and often up to 60 or 100 parts carrier gas per unit of treatment gas. Carrier gas can be utilized in even greater excesses, but once sufficient velocity of the admixture of gases from the nozzle is provided, greater velocity does not improve results.

Treatment gas is stored in tanks, usually in liquid form and passed through a regulator and flow meter at the above-specified rates. Carrier gas from any convenient source is likewise regulated and checked utilizing a flow meter and admixed with the treatment gas upstream of the nozzle.

The treatment gas-carrier gas admixture issuing from the nozzle is colorless, and the effects of the treatment are not physically apparent. Thus, to an observer, the appearance of the process would not be altered if the gas was not issuing from the nozzle. However, since chemical durability of glass is a very critical property, it is necessary to ensure that the glass containers are, in fact, being treated. According to the instant invention, this may be conveniently and definitely established by choosing a flammable treatment gas and adjusting the mixture of carrier gas and treatment gas to render the mixture flammable. Thus, when the mixture enters the bottle, which is at a temperature of at least 960° F., and usually close to 1100° F., the admixture bursts into flame.

Since the treatment gas whether in a flammable mixture or not apparently undergoes pyrolytic degradation, it appears that the resultant products are the same whether flame occurs or not, since the results have been found to be substantially identical whether the treatment gas is applied in a flammable mixture or nonflammable mixture. However, by utilizing a flammable mixture, an ignition flash clearly indicates that a container has, in fact, been properly exposed to the treatment gas. Thus, by positioning a photocell adjacent the treatment station, the flash observed by the photocell can produce a signal which will automatically pass as acceptable those bottles in which there is a flash and, by a gate, or other transfer mechanism, automatically cull out those containers in which no flash occurs. By recycling the "non-flash" containers, with reheating if necessary, the rejected containers can be rendered acceptable. Other ignition flash sensing means, such as an ultraviolet sensor, may of course be employed. By providing a sensing means indicating the presence of the bottle, and coordinating the signal from that sensing means with the signal from the photocell indicating the presence or absence of an ignition flash, a visual, audible or other alarm can be given to the operator indicating that containers are not being properly treated. These inspection systems will be discussed in more detail below.

The invention will be more readily understood with reference to the drawing, wherein:

FIG. 1 is a perspective view of the treatment apparatus of the instant invention;

FIG. 2 is a schematic representation of the treatment material supply system;

Figure 4:
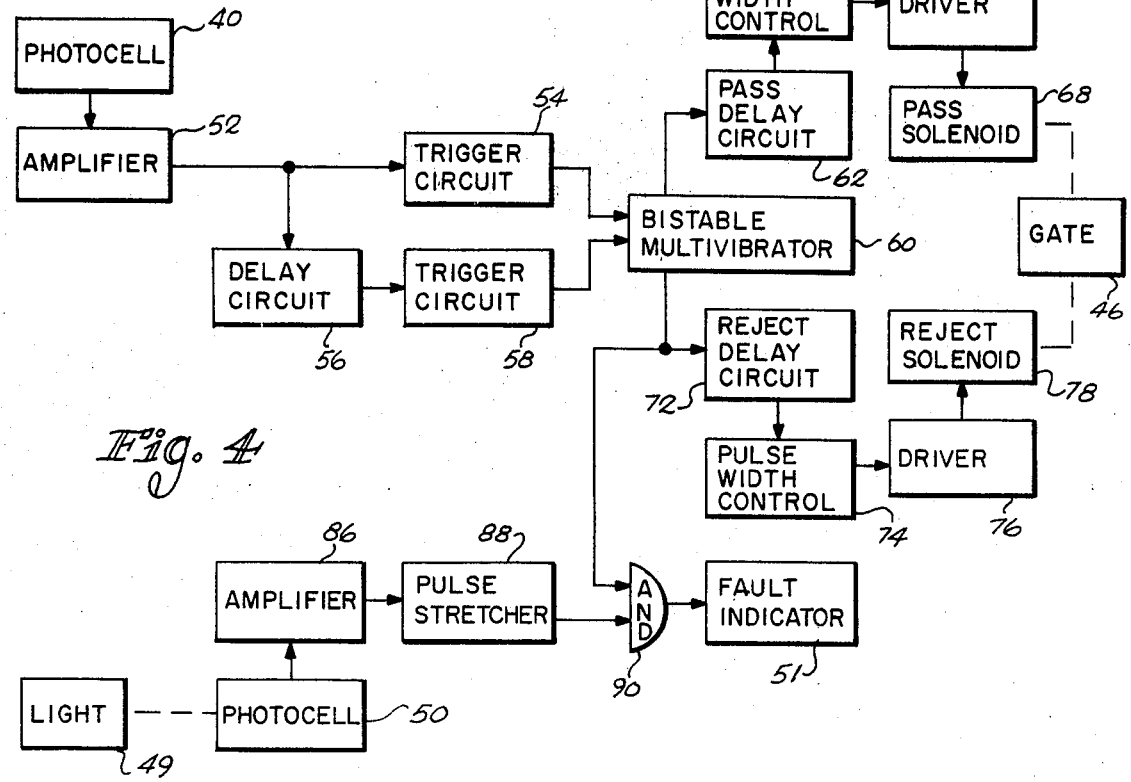
FIG. 4 is a block diagram of an electrical circuit suitable for use in the inspection apparatus.

With reference to FIG. 1, it will be noted that bottles 10 are being transported on belt 12. Belt 12 represents any of the belts between the glass forming machine (not shown) and the annealing lehr (not shown). However, it is preferable that belt 12 be the conveyor belt between the dead plate, not shown, and the transfer mechanism, not shown, onto the lehr belt. Bottles 10 are urged by guide means 14 to pass directly under nozzle 16. Nozzle 16 is connected by means of hose 18 to a supply metering system (not shown) for treatment material.

The treatment material metering and supply system is shown in FIG. 2. The treatment material is preferably stored as a liquid under pressure in tanks 20. Tanks 20 are redundant in order to insure a trouble free change from the exhausted tank to the reserve tank with uninterrupted flow of treatment material. This is provided by shut-off valves 22 and 23 and selector valve 24. After being released from one of tanks 20, the treatment material is changed to vapor form by expansion through regulator 26. Regulator 26 also controls the flow rate of the treatment material. Flow rate is established and checked by reference to flow meter 28. After being expanded and regulated, the treatment material flows in predetermined quantity rates through line 30.

In another portion of the treatment material supply and metering system, an air source 32, which may be a compressor, tank, or other conventional source, is likewise passed through a regulator 34 and a flow meter 36 to provide a measured quantity rate of air to line 38. Line 30, carrying the treatment material, and line 38 carrying the air, join together to form line 18 which connects to nozzle 16 and operates in the manner shown in FIG. 1.

Figure 3:
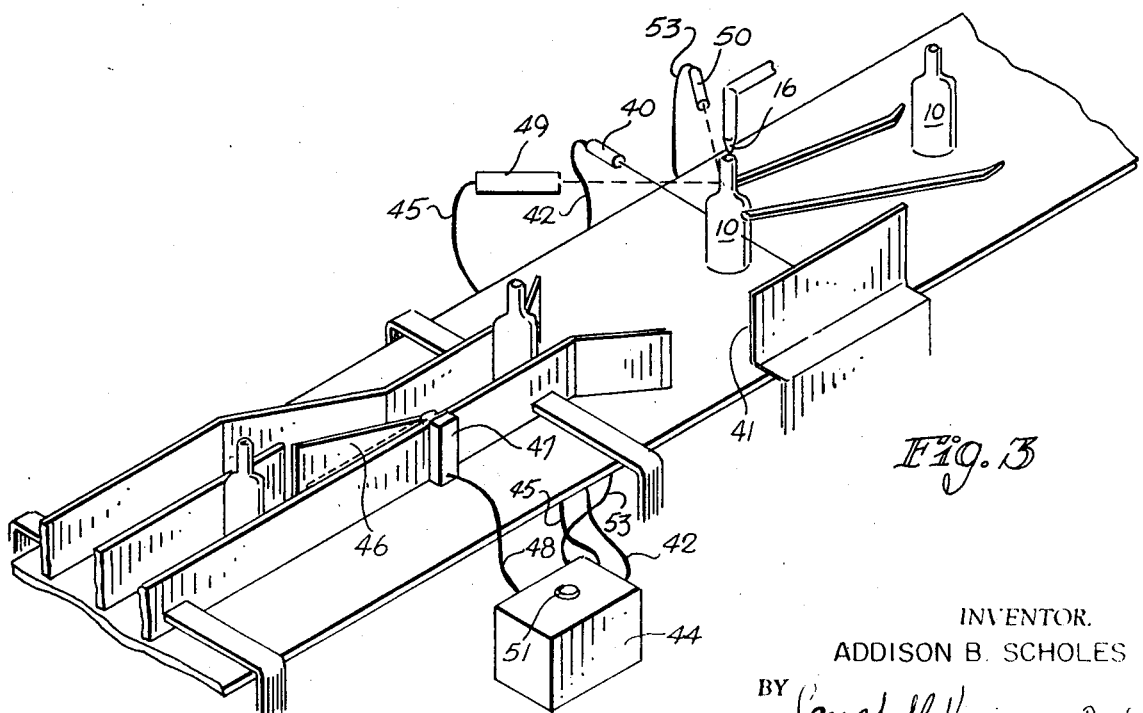
FIG. 3 is a perspective view as in FIG. 1 which includes inspection equipment.

An embodiment of the invention incorporating the testing or monitoring capability is shown in FIG. 3. The apparatus in FIG. 3 is essentially the same as that of FIG. 1, but includes a photocell 40 positioned adjacent a bottle 10 located directly under nozzle 16. Photocell 40 is preferably shielded from stray light by shield 41. A photocell is connected by means of wire 42 to control apparatus 44 which is in turn connected to gate 46 and actuating means 47 by means of wire 48. Actuating means 47 may be solenoids, pneumatic cylinders, or other conventional means. The inspection apparatus relies upon the use of an inflammable treatment mixture to ensure that each bottle 10 is, in fact, treated. When the flammable treatment material mixture issues from nozzle 16 into bottle 10, the temperature of bottle 10, which is usually between 900° F. and 1200° F., causes the treatment material to ignite. The flash caused by the igniting treatment material is in part projected upon photocell 40 to cause an output therefrom. This output is conducted to control means 44 by means of wire 42. Control means 44 in turn produces an output to gate 46 via wire 48 to cause gate 46 to assume an "accept" position. A delayed signal causes the gate 46 to return to the "reject" position, shown by dotted lines.

However, if there is no treatment of bottle 10, and accordingly no ignition flash, gate 46 is in the "reject" position when the bottle arrives and is shuttled aside for discard or recycle through the treatment apparatus.

Also shown is the optional alarm system. A light source 49 drawing power through wire 45 is directed at bottle 10 in such a manner as to not affect photocell 40. However, when bottle 10 is below nozzle 16 a portion of the light from light source 49 is directed to photocell 50. A signal received through wire 53 from photocell 50 indicating the presence of bottle 10 is compared with the signal, or absence thereof, from photocell 40. If there is no ignition flash, and thus no signal from photocell 40, a suitable alarm, such as light indicator 51 alerts the operator to the fact that bottles are passing through the treatment station without being treated.

Control means 44 may be any of many acceptable circuits which will be readily apparent to those skilled in the art. However, the circuit shown in FIG. 4 provides a simple, foolproof means of properly coordinating output from photocell 40 with the proper positioning of gate 46, and also a means of indicating absence of treatment.

Upon sensing of the ignition flash, photocell 40 produces an output pulse that is coupled through conventional amplifier 52 to trigger circuit 54 and delay circuit 56. The output from delay circuit 56 is then coupled to trigger circuit 58.

The outputs from trigger circuits 54 and 58 are coupled to opposite sides of bistable multivibrator 60. If an output signal is coupled from trigger circuit 54 to bistable multivibrator 60, this will cause the multivibrator to change states and produce an output that is coupled through pass delay circuit 62 to a pulse width control 64, with the output from pulse width control 64 being then coupled through conventional driver 66 to conventional pass solenoid 68 which effects opening of gate 46 at the proper time to allow a treated bottle to pass.

If photocell 40 did not sense an ignition flash at the time of bottle treatment, however, then there is no pulse coupled through amplifier 52 to trigger circuit 54. This results, of course, in no change of state of bistable multivibrator 60, and pass solenoid 68 is not energized so that gate 46 remains in the closed position.

The delayed output to bistable multivibrator 60 coupled from amplifier 52 through trigger circuit 58, causes the multivibrator to be reset at a predetermined time after ignition flash has been sensed by photocell 40. Resetting of multivibrator 60 causes an output to be coupled from the other side of bistable multivibrator 60 to reject delay circuit 72, the output of which is coupled to pulse width control 74. The output from pulse width control 74 is coupled through conventional driver 76 to conventional reject solenoid 78 which causes the gate to be closed at a predetermined time as determined by the delay circuit, this time period being sufficient to allow an inspected article to pass but not sufficient to permit a succeeding article to reach the gate. The gate will therefore be maintained in reject, or closed, position at all times except when photocell 40 senses that a bottle has been treated.

If desired, a second photocell 50 can be provided for fault indicating purposes, this photocell also being positioned at the treating position, or area. A narrow beam light source 49 is provided so that the beam is reflected at an angle from a portion of the article, preferably the finish or a like surface where the light beam will not affect operation of photocell 40. Thus, when photocell 50 senses article presence by receiving the reflected light from light source 49, an output pulse is produced that is coupled through conventional amplifier 86 to pulse stretcher 88, which can be, for example, a conventional monostable multivibrator. The output from pulse stretcher 88 is then coupled to AND gate 90, which gate receives a second input from the reject output side of bistable multivibrator 60.

Thus, when photocell 40 fails to sense an ignition flash so that bistable multivibrator 60 is not caused to change states, an output indicating reject is also coupled to AND gate 90. An output cannot be produced, however, from AND gate 90 until a second input is provided thereto from photocell 50 to indicate the presence of an article at the treating station. If both inputs are received in coincidence, then AND gate 90 produces an output signal that is coupled to a conventional fault indicator 51, which may be a light, for example, as shown in FIG. 3, or could be an audible alarm such as a bell.

The trigger circuits, delay circuits, and pulse width controls may be monostable multivibrators, such as shown and described in U.S. Pat. No. 3,386,575, issued to R. M. Quinn on June 4, 1968 and assigned to the assignee of the present invention. In addition, a bistable multivibrator as shown and described in said patent may be utilized as bistable multivibrator 60 herein.

From the above discussion, it will be apparent that the instant invention utilizes a very low concentration of treatment gas in order to avoid the complicated treatment gas conserving methods and apparatus previously resorted to for increasing the chemical durability of glass containers. Instead, the instant invention relies upon an extremely simple process and apparatus, the simplicity constituting the most significant aspect of the invention. Also, the instant invention provides a simple and foolproof method of monitoring the treatment to prevent inadvertent failure to treat containers which may, when the containers are put to use, cause most serious adverse results. Optionally, the monitoring apparatus may include an alarm arrangement whereby such failure to treat glass containers is promptly called to the attention of an operator. The alarm system and the automatic reject monitoring system may be utilized either separately or in conjunction with each other.

It will be apparent from the above description and drawings that various modifications of the method and apparatus may be made within the scope of the invention.

Therefore, the invention is not intended to be limited to the particular examples or illustrations employed except as may be required by the following claims.

What is claimed is:

1. Apparatus for improving the chemical durability of glass containers and monitoring such treatment comprising a conveyor, a downwardly disposed nozzle positioned above the conveyor and connected to a source of flammable treatment gas, ignition flash sensing means positioned adjacent to the conveyor at a point beneath the nozzle, control means adapted to receive a signal from the ignition flash sensing means, and a gate connected to the control means and adapted to change from a first to a second position and then back to the first position in response to a signal received from the ignition flash sensing means whereby glass containers on the conveyor are conducted to different tracks in response to the ocurrence or nonoccurrence of the sensing of an ignition flash of the treatment gas in the container by the ignition flash sensing means.

2. Apparatus as set forth in claim 1 wherein the ignition flash sensing means is a photocell.

3. Apparatus as set forth in claim 1 which also comprises article-presence indicating means positioned adjacent and below the nozzle, comparator means to compare the signal from the ignition flash sensing means and the signal from the article-presence indicting means and indicate through an alarm means the situation in which a signal is received from the article-presence indicating means and no signal is received from the ignition flash sensing means.

4. Apparatus as set forth in claim 3 wherein the article-presence indicating means is a light source and a photocell.

5. Apparatus as set forth in claim 3 in which the ignition flash sensing means is a photocell.

6. Apparatus as set forth in claim 3 wherein the alarm means is a visual alarm means.

7. Apparatus as set forth in claim 3 wherein the alarm means is an audible alarm system.

8. In an apparatus for improving the chemical durability of glass including a nozzle for dispensing flammable treatment gas into a heated glass container, the improvement comprising an ignition flash sensing means disposed to sense the ignition of the flammable treatment gas in the container, container presence sensing means located beneath the nozzle to indicate the presence of a container, comparison alarm means to compare the signal from the ignition flash sensing means and the container presence sensing means and sound an alarm when a signal is received from the container presence sensing means and not from the ignition flash sensing means.

9. Apparatus as set forth in claim 8 wherein the container presence sensing means is a light source and a cooperating photocell.

10. Apparatus as set forth in claim 8 wherein the ignition flash sensing means is a photocell.

References Cited

UNITED STATES PATENTS

| | | | |
|---|---|---|---|
| 2,375,482 | 5/1945 | Lyle | 65—60 X |
| 2,727,830 | 12/1955 | Janssen et al. | 65—60 X |
| 3,195,501 | 8/1965 | Barkhau | 65—60 X |
| 3,479,208 | 11/1969 | Dubble et al. | 65—60 X |
| 3,516,811 | 6/1970 | Gatchet et al. | 65—60 |

OTHER REFERENCES

Sumner, W.: "Photosensitors," Chapman and Hall, Ltd., London, Eng., pp. 431–441, 479–493, 1957.

FRANK W. MIGA, Primary Examiner

U.S. Cl. X.R.

65—29, 30, 60, 158, 162; 117—124; 118—317